United States Patent
Parnin

(10) Patent No.: US 10,041,489 B2
(45) Date of Patent: Aug. 7, 2018

(54) AUXILIARY PUMP AND GAS TURBINE ENGINE OIL CIRCUIT MONITORING SYSTEM

(71) Applicant: United Technologies Corporation, Farmington, CT (US)

(72) Inventor: Francis Parnin, Suffield, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 193 days.

(21) Appl. No.: 14/920,287

(22) Filed: Oct. 22, 2015

(65) Prior Publication Data

US 2017/0114784 A1    Apr. 27, 2017

(51) Int. Cl.
| | |
|---|---|
| *F04B 51/00* | (2006.01) |
| *F01D 25/20* | (2006.01) |
| *F02K 3/06* | (2006.01) |
| *F02C 7/06* | (2006.01) |
| *F02C 7/32* | (2006.01) |

(52) U.S. Cl.
CPC .............. *F04B 51/00* (2013.01); *F01D 25/20* (2013.01); *F02C 7/06* (2013.01); *F02C 7/32* (2013.01); *F02K 3/06* (2013.01); *F05D 2260/40311* (2013.01); *F05D 2260/80* (2013.01); *F05D 2260/98* (2013.01)

(58) Field of Classification Search
CPC ........ F04B 39/0261; F04B 39/02; F04B 51/00
See application file for complete search history.

(56) References Cited

U.S. PATENT DOCUMENTS

| | | | | |
|---|---|---|---|---|
| 2008/0064562 A1* | 3/2008 | Aettel | ................. | B60K 6/40 477/34 |
| 2010/0101785 A1* | 4/2010 | Khvoshchev | ........... | E21B 34/16 166/250.01 |
| 2010/0154398 A1* | 6/2010 | Ochi | ................. | F04B 49/002 60/325 |
| 2010/0294597 A1* | 11/2010 | Parnin | ................. | F01D 25/18 184/6.1 |
| 2013/0319798 A1 | 12/2013 | Sheridan et al. | | |

FOREIGN PATENT DOCUMENTS

| | | |
|---|---|---|
| WO | 2015076903 | 5/2015 |
| WO | 2015126500 | 8/2015 |

OTHER PUBLICATIONS

EP Application No. 16195014.2 Extended European Search Report, Issued Mar. 15, 2017, 9 pages.

\* cited by examiner

*Primary Examiner* — Erika J Villaluna
(74) *Attorney, Agent, or Firm* — Cantor Colburn LLP

(57) ABSTRACT

A method of monitoring performance of an auxiliary pump is provided. A monitoring system measures a first pressure at a location supplied by a main pump and the auxiliary pump while the auxiliary pump is operated at a first speed. The monitoring system measures a second pressure at the location while the auxiliary pump is operated at a second speed. The monitoring system calculates performance of the auxiliary pump based on a difference between the first pressure and the second pressure divided by a difference between the first speed and the second speed. The monitoring system tracks the performance of the auxiliary pump over time by repeating the measuring and calculating over time.

16 Claims, 3 Drawing Sheets

AUXILIARY PUMP AND GAS TURBINE ENGINE OIL CIRCUIT MONITORING SYSTEM

BACKGROUND

The present disclosure generally relates to aircraft propulsion systems, and more particularly, to an auxiliary pump and gas turbine engine oil circuit monitoring system.

Geared turbofan engines typically require an auxiliary oil supply circuit to provide oil to gearbox journal bearings in the event that the supply from the main oil system is interrupted. An auxiliary oil circuit pump can be monitored to prevent an undetected latent failure from starving the journal bearings. Monitoring of the auxiliary oil circuit pump can be performed with a simple pressure check using a pressure sensor; however, certain engine configurations can make this check ambiguous if the sensor location is subject to pressure from the main oil system.

BRIEF DESCRIPTION

Disclosed herein is a method of monitoring performance of an auxiliary pump. A monitoring system measures a first pressure at a location supplied by a main pump and the auxiliary pump while the auxiliary pump is operated at a first speed. The monitoring system measures a second pressure at the location while the auxiliary pump is operated at a second speed. The monitoring system calculates performance of the auxiliary pump based on a difference between the first pressure and the second pressure divided by a difference between the first speed and the second speed. The monitoring system tracks the performance of the auxiliary pump over time by repeating the measuring and calculating over time.

In addition to one or more of the features described above or below, or as an alternative, further embodiments could include determining that performance of the auxiliary pump is unacceptable when the calculated performance is below a threshold value.

In addition to one or more of the features described above or below, or as an alternative, further embodiments could include setting the threshold value based on measurements made with auxiliary pumps having unacceptable performance or based on design standard performance equations.

In addition to one or more of the features described above or below, or as an alternative, further embodiments could include predicting when the performance of the auxiliary pump will drop below the threshold value.

In addition to one or more of the features described above or below, or as an alternative, further embodiments could include outputting an auxiliary pump health indicator based on the performance of the auxiliary pump.

In accordance with an embodiment, a gas turbine engine oil circuit monitoring system includes a main oil pump configured to supply oil to a geared architecture, an auxiliary oil pump configured to supply oil to the geared architecture, and a monitoring system configured to determine when performance of the auxiliary oil pump is below a threshold value.

In addition to one or more of the features described above or below, or as an alternative, further embodiments could include where the monitoring system monitors a single pressure supplied by both the main oil pump and the auxiliary oil pump.

In addition to one or more of the features described above or below, or as an alternative, further embodiments could include where the monitoring systems monitors a speed of the auxiliary oil pump.

In addition to one or more of the features described above or below, or as an alternative, further embodiments could include where the speed of the auxiliary oil pump is based on a speed of a fan driven by the geared architecture.

In addition to one or more of the features described above or below, or as an alternative, further embodiments could include where the main oil pump is driven by a different source than the auxiliary oil pump.

In addition to one or more of the features described above or below, or as an alternative, further embodiments could include where the monitoring system is further configured to predict when the performance of the auxiliary oil pump will be below the threshold value.

In addition to one or more of the features described above or below, or as an alternative, further embodiments could include where the auxiliary oil pump includes an auxiliary pump stage and a windmill pump stage.

In accordance with an embodiment, a gas turbine engine includes a system that monitors performance of an auxiliary oil pump based on changes in pressure relative to changes in speed of the auxiliary oil pump. The auxiliary oil pump supplies oil in combination with a main oil pump to a geared architecture that drives a fan of the gas turbine engine.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
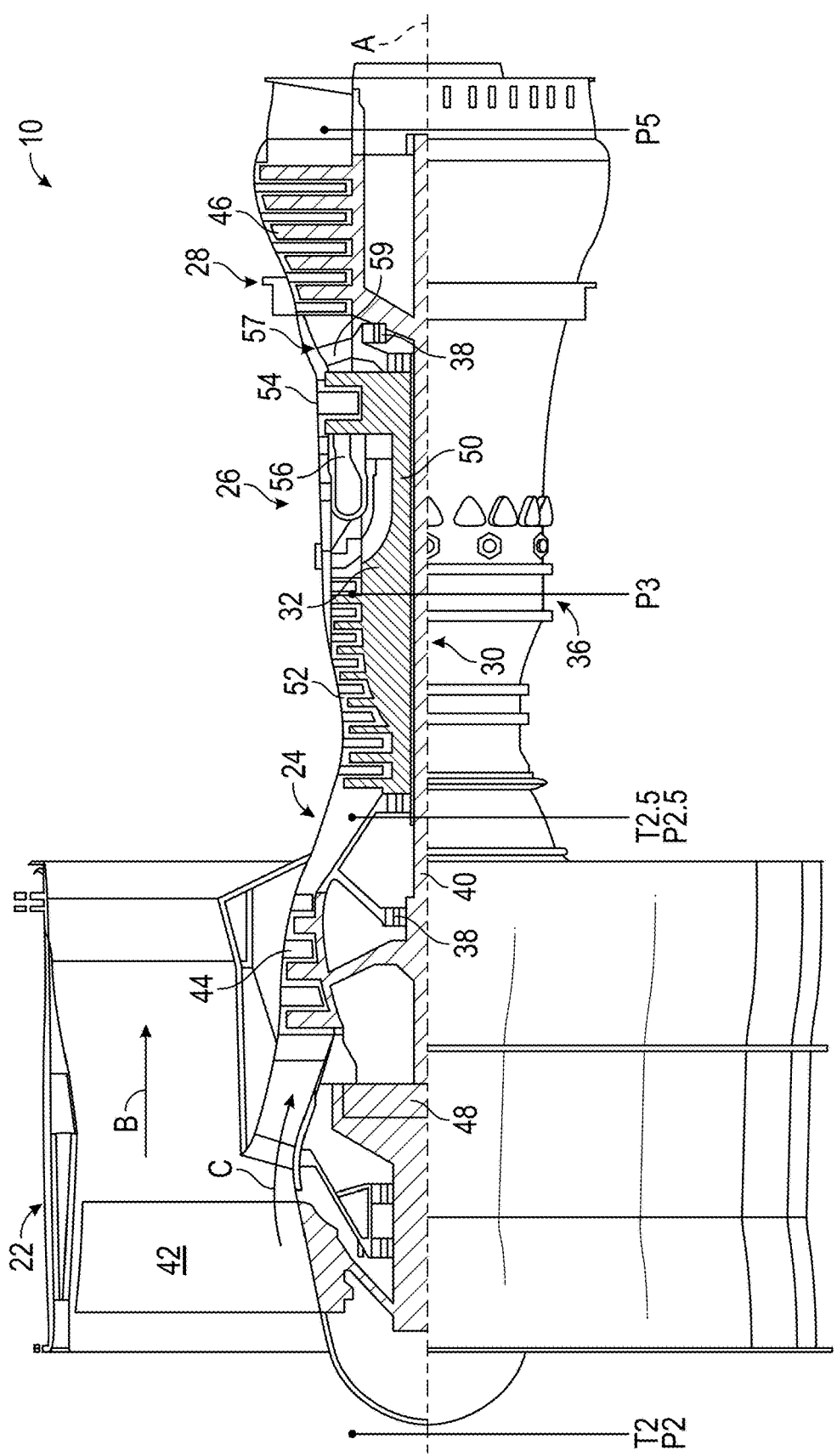
FIG. 1 depicts a schematical illustration of a gas turbine engine, according to an embodiment.

FIG. 1 schematically illustrates a gas turbine engine 10 that can be used to power an aircraft, for example. The gas turbine engine 10 is disclosed herein as a two-spool turbofan that generally incorporates a fan section 22, a compressor section 24, a combustor section 26 and a turbine section 28. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 10 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 10 is, in one embodiment, a high-bypass geared aircraft engine. In another embodiment, the engine 10 bypass ratio is greater than about eleven (11), with one example embodiment having a bypass ratio in the range of eleven (11) to seventeen (17), and another example embodiment having a bypass ratio in the range of eleven and six tenths (11.6) to fifteen (15), and a further example embodiment being approximately eleven and seven tenths (11.7). The geared architecture 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 10 bypass ratio is greater than about eleven (11:1), the fan diameter is larger than that of the low pressure compressor 44, and the low pressure turbine 46 has a pressure ratio that is greater than about 5:1. Low pressure turbine 46 pressure ratio is pressure measured prior to an inlet of the low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines.

A significant amount of thrust is provided by the bypass flow due to the high bypass ratio. The fan section 22 of the engine 10 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram° R)/(518.7° R)]^{0.5}$. The "Low corrected fan tip speed" as disclosed herein according to one non-limiting embodiment is less than about 1150 ft/second.

Existing turbine engine models, such as direct drive turbine engines, increase the bypass ratio of turbine engines by increasing the fan size, thereby increasing the amount of air that is drawn through the gas path of such engines. The large fan size necessitates an increased number of low pressure turbine stages in order to drive the fan at sufficient speeds. The additional turbine stages result in a heavier turbine engine where the number of low pressure turbine stages exceeds the number of low pressure compressor stages.

Figure 2:
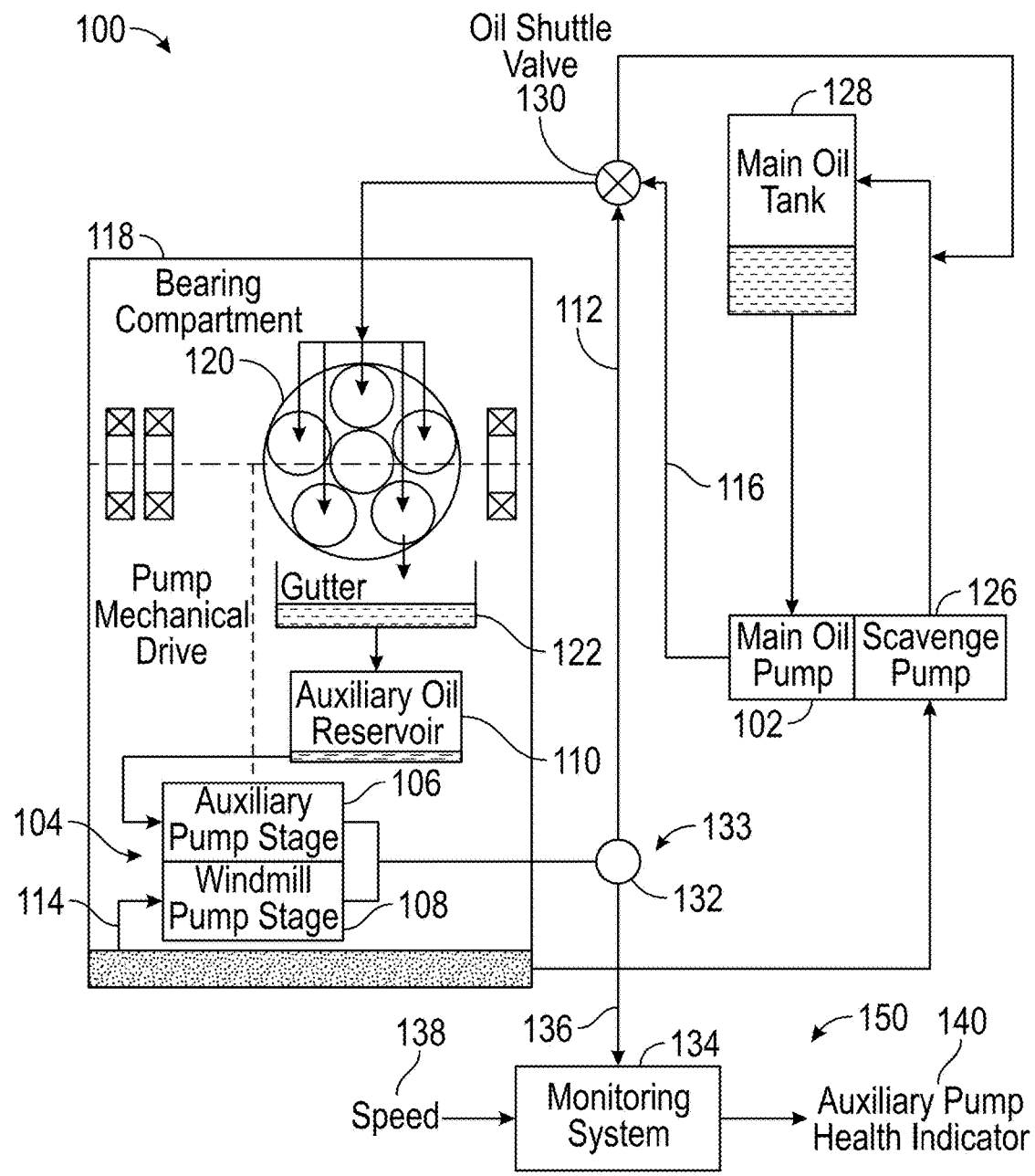
FIG. 2 depicts a gas turbine engine oil circuit, according to an embodiment.

FIG. 2 depicts a gas turbine engine oil circuit 100 according to an embodiment. The gas turbine engine oil circuit 100 includes a main oil pump 102 configured to supply oil to the geared architecture 48 of FIG. 1. An auxiliary oil pump 104 (referred to generally as an "auxiliary pump") is also configured to supply oil to the geared architecture 48 of FIG. 1. In the example of FIG. 2, the auxiliary oil pump 104 includes an auxiliary pump stage 106 and a windmill pump stage 108. The auxiliary oil pump 104 may be driven by gearing from fan 42 of FIG. 1, with power provided either from the low spool 30 via the geared architecture 48 of FIG. 1, or by air flow through the fan 42 of FIG. 1. The auxiliary pump stage 106 receives oil from an auxiliary oil reservoir 110 and feeds an auxiliary oil path 112 in combination with a windmill oil path 114 driven by the windmill pump stage 108. In an embodiment, the main oil pump 102 and the auxiliary oil pump 104 are driven by different sources of the gas turbine engine 10 of FIG. 1. As one example, the auxiliary oil pump 104 can be driven by rotation of the fan 42 of FIG. 1, while the main oil pump 102 can be driven by the high speed spool 32 of FIG. 1.

According to an embodiment, the main oil pump 102 provides a main oil supply 116 to a bearing compartment 118 of the geared architecture 48 of FIG. 1 to lubricate a plurality of bearings 120, such as journal bearings. Oil is captured in a gutter 122 and supplied to the auxiliary oil reservoir 110. A scavenge pump 126 returns oil to a main oil tank 128, which supplies oil to the main oil pump 102. An oil shuttle valve 130 controls whether oil supplied to the bearing 120 is from the main oil supply 116 or the auxiliary oil path 112. Oil from the auxiliary oil path 112 that is not directed to the bearing 120 is returned to the main oil tank 128.

In an embodiment, an auxiliary oil pressure sensor 132 is at a location 133 in the auxiliary oil path 112 between the auxiliary oil pump 104 and the oil shuttle valve 130. A monitoring system 134 receives an auxiliary oil pressure 136 from the auxiliary oil pressure sensor 132 and may also receive a speed 138 indicative of a rotational speed of the auxiliary oil pump 104. The location 133 of the auxiliary oil pressure sensor 132 may be selected such that the monitoring system 134 can monitor a single pressure supplied by both the main oil pump 102 and the auxiliary oil pump 104. The speed 138 can be received directly or indirectly from a speed sensor (not depicted) of the fan 42 of FIG. 1, where the auxiliary oil pump 104 is driven by the fan 42.

The monitoring system 134 may include memory to store instructions that are executed by a processor. The executable instructions may be stored or organized in any manner and at any level of abstraction, such as in connection with a controlling and/or monitoring operation of the engine 10 of FIG. 1. The processor can be any type of central processing unit (CPU), including a general purpose processor, a digital signal processor, a microcontroller, an application specific integrated circuit (ASIC), a field programmable gate array, or the like. Also, in embodiments, the memory may include random access memory (RAM), read only memory (ROM), or other electronic, optical, magnetic, or any other computer readable medium onto which is stored data and control algorithms in a non-transitory form. The monitoring system 134 can be embodied in an individual line-replaceable unit, within a control system (e.g., in an electronic engine control), and/or distributed between multiple electronic systems. The combination of the main oil pump 102, auxiliary oil pump 104, and monitoring system 134 may be referred to generally as gas turbine engine oil circuit monitoring system 150.

In an embodiment, the monitoring system 134 measures a first pressure at location 133 supplied by the main oil pump 102 and the auxiliary oil pump 104 while the auxiliary oil pump 104 is operated at a first speed. The monitoring system 134 subsequently measures a second pressure at the location 133 while the auxiliary oil pump 104 is operated at a second speed. The monitoring system 134 can calculate performance of the auxiliary oil pump 104 based on a difference between the first pressure and the second pressure divided by a difference between the first speed and the second speed. The monitoring system 134 tracks the performance of the auxiliary oil pump 104 over time by repeating the measuring and calculating over time. The monitoring system 134 can output an auxiliary pump health indicator 140 as a present state and/or predicted future state of the health of the auxiliary oil pump 104. The auxiliary pump health indicator 140 can be sent to an engine controller, a vehicle management system, a cockpit display, and/or a diagnostic system for logging and/or alerting of a present and/or anticipated health issue with the auxiliary oil pump 104. As one example, the monitoring system 134 can determine that the performance of the auxiliary oil pump 104 is unacceptable when the calculated performance is below a threshold value. The threshold value may be set based on measurements made with auxiliary pumps having unacceptable performance, based on design standard performance equations, or by a modeling system either within the monitoring system 134, the engine controller, or other processor either internal to or external to the aircraft. By observing trends in the calculated performance over a period of time, a performance decay rate can be determined to project (e.g., extrapolate) that a decay in performance over a period of time will likely drop below the threshold value within a prediction period of time (e.g., within a predetermined number of flight hours).

Figure 3:
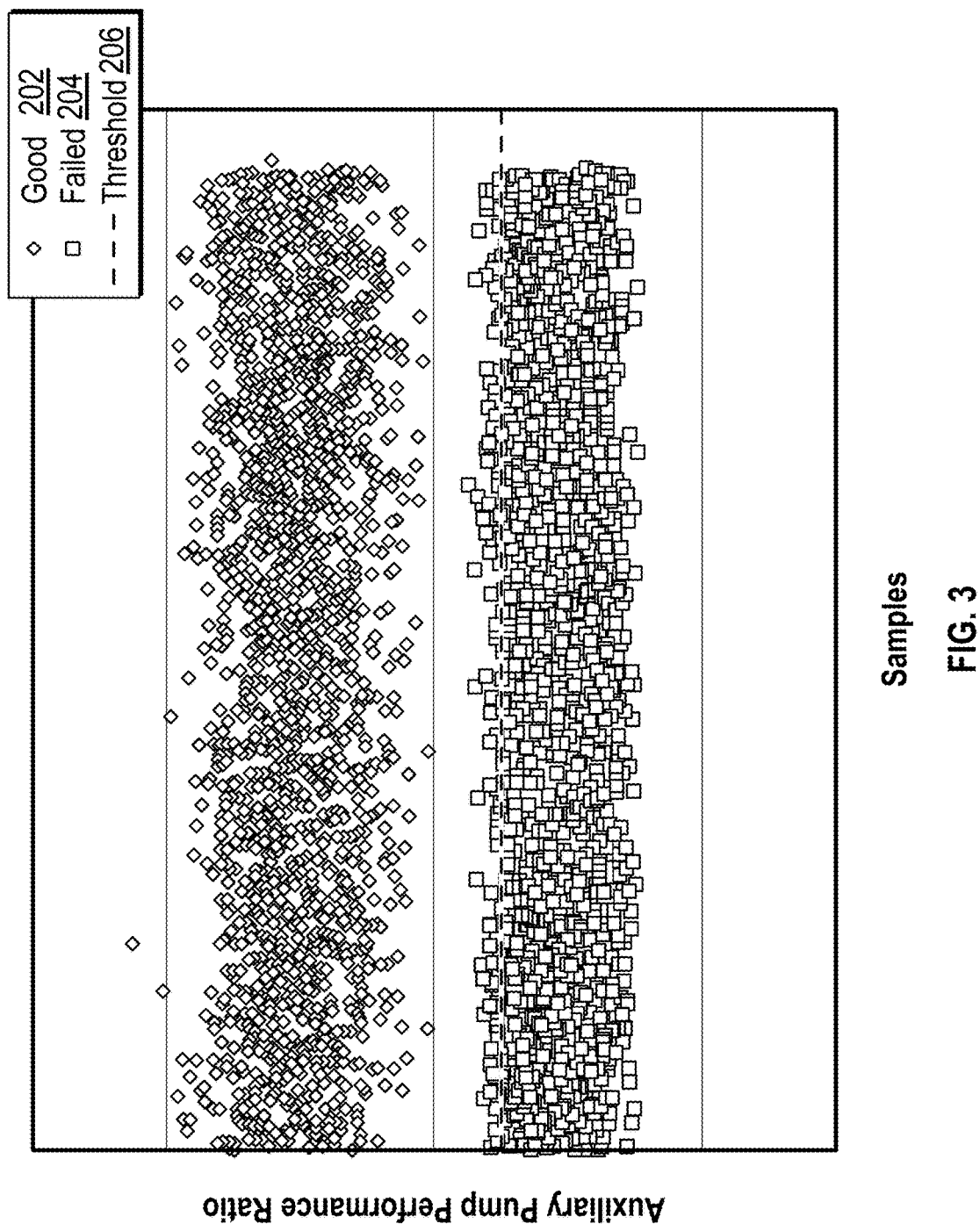
FIG. 3 depicts example plots of differences in oil pressure measured at two speeds of an auxiliary oil pump divided by differences in the two speeds for a number of good and a number of failed auxiliary oil pumps.

FIG. 3 depicts example plots of differences in oil pressure measured at two speeds of an auxiliary oil pump (such as auxiliary oil pump 104 of FIG. 2) divided by differences in the two speeds for a number of good auxiliary oil pumps 202 and a number of failed auxiliary oil pumps 204. An auxiliary pump performance ratio can be calculated as a pressure difference relative to a speed difference. The pressure difference can be determined as difference in an auxiliary oil pump pressure observed at takeoff (i.e., a first pressure) relative to an auxiliary oil pump pressure observed at idle (i.e., a second pressure). As one example, the auxiliary oil pump pressure can be the auxiliary oil pressure 136 of FIG. 2 from the auxiliary oil pressure sensor 132 of FIG. 2. The speed difference can be determined as a difference between the speed of the fan 42 of FIG. 1 (e.g., speed 138 of FIG. 2) at takeoff (i.e., a first speed) relative to the speed of the fan 42 of FIG. 1 observed at idle (i.e., a second speed). A threshold value 206 can be set between the auxiliary pump performance ratio values for the good auxiliary oil pumps 202 and the failed auxiliary oil pumps 204. Depending on the desired tolerance for false-positives verses rapid response time, the threshold value 206 may be selected as a value slightly below the auxiliary pump performance ratio values for the good auxiliary oil pumps 202 down to a value that is near an upper portion of the auxiliary pump performance ratio values for the failed auxiliary oil pumps 204. The resulting value of the threshold value 206 can be provided as a constant and loaded into non-volatile memory of the monitoring system 134 of FIG. 2.

Technical effects and benefits include monitoring performance of an auxiliary pump with respect to pressure changes relative to changes in one or more engine operating parameter to reduce false failure indications and ambiguity due to background pressure from the main pump. Auxiliary health pump status can be used to trigger maintenance and/or repair actions. Health monitoring of the auxiliary pump prevents undetected latent failures from starving bearings during flight conditions when the pump is needed.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method of monitoring performance of an auxiliary pump, the method comprising:
   measuring, by a monitoring system, a first pressure at a location supplied by a main pump and the auxiliary pump while the auxiliary pump is operated at a first speed;
   measuring, by the monitoring system, a second pressure at the location while the auxiliary pump is operated at a second speed;
   calculating, by the monitoring system, performance of the auxiliary pump as an auxiliary pump performance ratio of a pressure difference relative to a speed difference based on a difference between the first pressure and the second pressure divided by a difference between the first speed and the second speed;
   tracking, by the monitoring system, the performance of the auxiliary pump over time by repeating the measuring and calculating over time;
   determining a performance decay rate of the performance of the auxiliary pump;
   predicting when the performance of the auxiliary pump will drop below the threshold value based on the performance decay rate; and
   determining that the performance of the auxiliary pump is unacceptable when the calculated performance is below a threshold value.

2. The method of claim 1, further comprising setting the threshold value based on measurements made with auxiliary pumps having unacceptable performance or based on design standard performance equations.

3. The method of claim 1, further comprising outputting an auxiliary pump health indicator based on the performance of the auxiliary pump.

4. A gas turbine engine oil circuit monitoring system, comprising:
 a main oil pump configured to supply oil to a geared architecture;
 an auxiliary oil pump configured to supply oil to the geared architecture; and
 a monitoring system configured to determine a performance decay rate of performance of the auxiliary oil pump, predict when the performance of the auxiliary oil pump will be below a threshold value based on the performance decay rate, and determine when the performance of the auxiliary oil pump is below the threshold value based on an auxiliary pump performance ratio of a pressure difference at a location supplied by the main oil pump and auxiliary oil pump relative to a speed difference in operating the auxiliary oil pump.

5. The gas turbine engine oil circuit monitoring system of claim 4, wherein the monitoring system monitors a single pressure supplied by both the main oil pump and the auxiliary oil pump.

6. The gas turbine engine oil circuit monitoring system of claim 4, wherein the monitoring system monitors a speed of the auxiliary oil pump, the speed difference is determined between a takeoff speed and an idle speed, and the pressure difference is determined between a first pressure at the takeoff speed and a second pressure at the idle speed.

7. The gas turbine engine oil circuit monitoring system of claim 6, wherein the speed of the auxiliary oil pump is based on a speed of a fan driven by the geared architecture.

8. The gas turbine engine oil circuit monitoring system of claim 4, wherein the main oil pump is driven by a different source than the auxiliary oil pump.

9. The gas turbine engine oil circuit monitoring system of claim 4, wherein the threshold value is based on measurements made with auxiliary pumps having unacceptable performance or based on design standard performance equations.

10. The gas turbine engine oil circuit monitoring system of claim 4, wherein the monitoring system is further configured to output an auxiliary pump health indicator based on the performance of the auxiliary oil pump.

11. The gas turbine engine oil circuit monitoring system of claim 4, wherein the auxiliary oil pump comprises an auxiliary pump stage and a windmill pump stage.

12. A gas turbine engine with a system that monitors performance of an auxiliary oil pump based on changes in pressure relative to changes in speed of the auxiliary oil pump as an auxiliary pump performance ratio of a pressure difference at a location supplied by a main oil pump and the auxiliary oil pump relative to a speed difference in operating the auxiliary oil pump, determines a performance decay rate of the performance of the auxiliary oil pump, and predicts when the auxiliary oil pump performance will be below a threshold value based on the performance decay rate, the auxiliary oil pump supplying oil in combination with the main oil pump to a geared architecture that drives a fan of the gas turbine engine.

13. The gas turbine engine of claim 12, wherein the monitoring system monitors a single pressure supplied by both the main oil pump and the auxiliary oil pump.

14. The gas turbine engine of claim 12, wherein the monitoring system monitors a speed of the auxiliary oil pump, the speed difference is determined between a takeoff speed and an idle speed, and the pressure difference is determined between a first pressure at the takeoff speed and a second pressure at the idle speed.

15. The gas turbine engine of claim 14, wherein the speed of the auxiliary oil pump is based on a speed of the fan.

16. The gas turbine engine of claim 12, wherein the main oil pump is driven by a different source than the auxiliary oil pump.

* * * * *